(12) United States Patent
Favre et al.

(10) Patent No.: US 10,797,556 B2
(45) Date of Patent: Oct. 6, 2020

(54) ROTARY ELECTRIC MACHINE COMPRISING A ROTOR AND A STATOR FOR THE PASSAGE OF A FLUID

(71) Applicants: IFP Energies nouvelles, Rueil-Malmaison (FR); MAVEL S.r.l., Pont Saint Martin (IT)

(72) Inventors: Luca Favre, Valpelline (IT); Davide Bettoni, Settimo Vittone To Italy (IT)

(73) Assignees: IFP ENERGIES NOUVELLES, Rueil-Malmaison (FR); MAVEL S.R.L., Pont Saint Martin (AO) (IT)

( * ) Notice: Subject to any disclaimer, the term of this patent is extended or adjusted under 35 U.S.C. 154(b) by 0 days.

(21) Appl. No.: 15/761,296

(22) PCT Filed: Sep. 7, 2016

(86) PCT No.: PCT/EP2016/071095
§ 371 (c)(1),
(2) Date: Mar. 19, 2018

(87) PCT Pub. No.: WO2017/050577
PCT Pub. Date: Mar. 30, 2017

(65) Prior Publication Data
US 2018/0269744 A1 Sep. 20, 2018

(30) Foreign Application Priority Data
Sep. 25, 2015 (FR) ...................................... 15 59046

(51) Int. Cl.
*H02K 5/128* (2006.01)
*H02K 3/24* (2006.01)
(Continued)

(52) U.S. Cl.
CPC ............... *H02K 5/128* (2013.01); *H02K 1/20* (2013.01); *H02K 3/24* (2013.01); *H02K 7/088* (2013.01);
(Continued)

(58) Field of Classification Search
CPC .......... H02K 21/44; H02K 3/24; H02K 5/128; H02K 9/19; H02K 1/20; H02K 7/088; H02K 9/00
(Continued)

(56) References Cited

U.S. PATENT DOCUMENTS 7,190,101 B2 * 3/2007 Hirzel .................. H02K 3/12
310/180
2002/0130573 A1 9/2002 Kikuchi et al.
(Continued)

FOREIGN PATENT DOCUMENTS

| AT | 509660 A1 | 10/2011 |
| EP | 1241773 A2 | 9/2002 |
| EP | 1499001 A1 | 1/2005 |

OTHER PUBLICATIONS

International Search Report for PCT/EP2016/071095 dated Dec. 8, 2016; English translation submitted herewith (7 pages).

*Primary Examiner* — Alex W Mok
(74) *Attorney, Agent, or Firm* — Fitch, Even, Tabin & Flannery LLP

(57) ABSTRACT

The present invention is an electrical machine comprising a rotor (10) and a stator (12) having radial passages (28) arranged circumferentially along the stator, magnetic-flux generators (34) housed in the passages, and a stator bearing (24) containing the rotor. According to the invention, the radial passages (28) comprise fluid-circulation galleries (36) facing the magnetic-flux generators (34).

20 Claims, 2 Drawing Sheets

(51) Int. Cl.
    *H02K 9/19*     (2006.01)
    *H02K 21/44*     (2006.01)
    *H02K 7/08*     (2006.01)
    *H02K 1/20*     (2006.01)
    *H02K 9/00*     (2006.01)

(52) U.S. Cl.
    CPC ................ *H02K 9/00* (2013.01); *H02K 9/19* (2013.01); *H02K 21/44* (2013.01)

(58) Field of Classification Search
    USPC .......................................................... 310/52
    See application file for complete search history.

(56) References Cited

U.S. PATENT DOCUMENTS

| | | |
|---|---|---|
| 2003/0057800 A1 | 3/2003 | Gizaw |
| 2004/0189108 A1* | 9/2004 | Dooley .................... H02K 1/02 |
| | | 310/52 |
| 2005/0012409 A1 | 1/2005 | Philippart |
| 2008/0042498 A1 | 2/2008 | Beer |
| 2008/0289333 A1 | 11/2008 | Godeke et al. |
| 2009/0022610 A1 | 1/2009 | Materne et al. |
| 2013/0043745 A1 | 2/2013 | Hussain et al. |
| 2013/0106232 A1* | 5/2013 | Kobayashi ........... H02K 15/095 |
| | | 310/208 |
| 2013/0169074 A1 | 7/2013 | Hussain et al. |
| 2015/0122235 A1* | 5/2015 | Arita ...................... H02K 21/44 |
| | | 123/565 |

* cited by examiner

ROTARY ELECTRIC MACHINE COMPRISING A ROTOR AND A STATOR FOR THE PASSAGE OF A FLUID

CROSS REFERENCE TO RELATED APPLICATIONS

Reference is made to International Application No. PCT/EP2016/071095 filed Sep. 7, 2016, and French Application No. 15/59.046 filed Sep. 25, 2015, which applications are incorporated herein by reference in their entirety.

BACKGROUND OF THE INVENTION

Field of the Invention

The present invention relates to rotary electrical machines comprising a rotor and a stator which has fluid circulation passages for circulating a cooling fluid.

Description of the Prior Art

In general, such electrical machines comprise a stator and a rotor which are arranged coaxially one inside the other.

The rotor is formed of a rotor body bearing magnetic-flux generators such as permanent magnets or windings. The rotor is generally housed inside the stator which contains magnetic-flux generators in the form of electrical windings (or armature windings) to generate a magnetic field making it possible to rotate the rotor in association with the magnetic field generated by the magnets or the windings of the rotor.

The stator usually comprises a plurality of radial slots directed towards the rotor which extend all along the periphery of the stator. These slots are designed to accept the armature windings which are fixed therein by any known mechanism.

A type of electrical machine with a large air gap between the rotor and the stator, or "Air Gap" machine" is already known, where the air gap may sometimes measure several centimeters which allow a gaseous or liquid fluid to be passed through this air gap.

This type of machine is notably known from U.S. published patent US 2008289333 or US 2013169074 or US 2013043745 which are synchronous reluctance machines with a large air gap operating at low speed where the large air gap allows a cooling fluid to be conveyed therethrough.

However, this large air gap is a disadvantage in ensuring that the magnetic flux passes between the rotor and the stator and therefore represents a limit on the intrinsic efficiency of the electrical machine and the size of the stator for the same amount of delivered power.

SUMMARY OF THE INVENTION

The present invention overcomes the disadvantages listed hereinabove by using a machine with a small air gap, allowing better conversion of energy between the stator and the rotor, and the possibility of passing cooling fluid through the machine.

To this end, the present invention relates to an electrical machine comprising a rotor and a stator comprising radial passages arranged circumferentially along the stator, in which magnetic-flux generators are housed in the passages, and a stator bearing accepting the rotor, with the radial passages comprising fluid-circulation passages including galleries facing the magnetic-flux generators.

The radial passages may be bounded by radial webs, a planar annular external border of the stator and the stator bearing.

The fluid circulation passages may be delimited by the radial webs, the planar annular external border of the stator and the magnetic-flux generators.

The fluid-circulation passages may be delimited by the radial webs, the stator bearing and the magnetic-flux generators.

The webs may have an axial direction substantially parallel to the longitudinal axis of the stator.

The webs may have an axial direction that is inclined with respect to the longitudinal axis of the stator.

The webs may have a direction that is twisted with respect to the longitudinal axis of the stator.

The webs may, in longitudinal section, have an aerodynamic profile.

The fluid may be a liquid or gaseous cooling fluid for the machine.

The fluid may be a fluid compatible with the food or petrochemical industries or with the building and public works industry.

BRIEF DESCRIPTION OF THE DRAWINGS

The other features and advantages of the invention will now become apparent from reading the description which will follow, which is given solely by way of illustrative and nonlimiting example, and to which are appended.

DETAILED DESCRIPTION OF THE INVENTION

Figure 1:
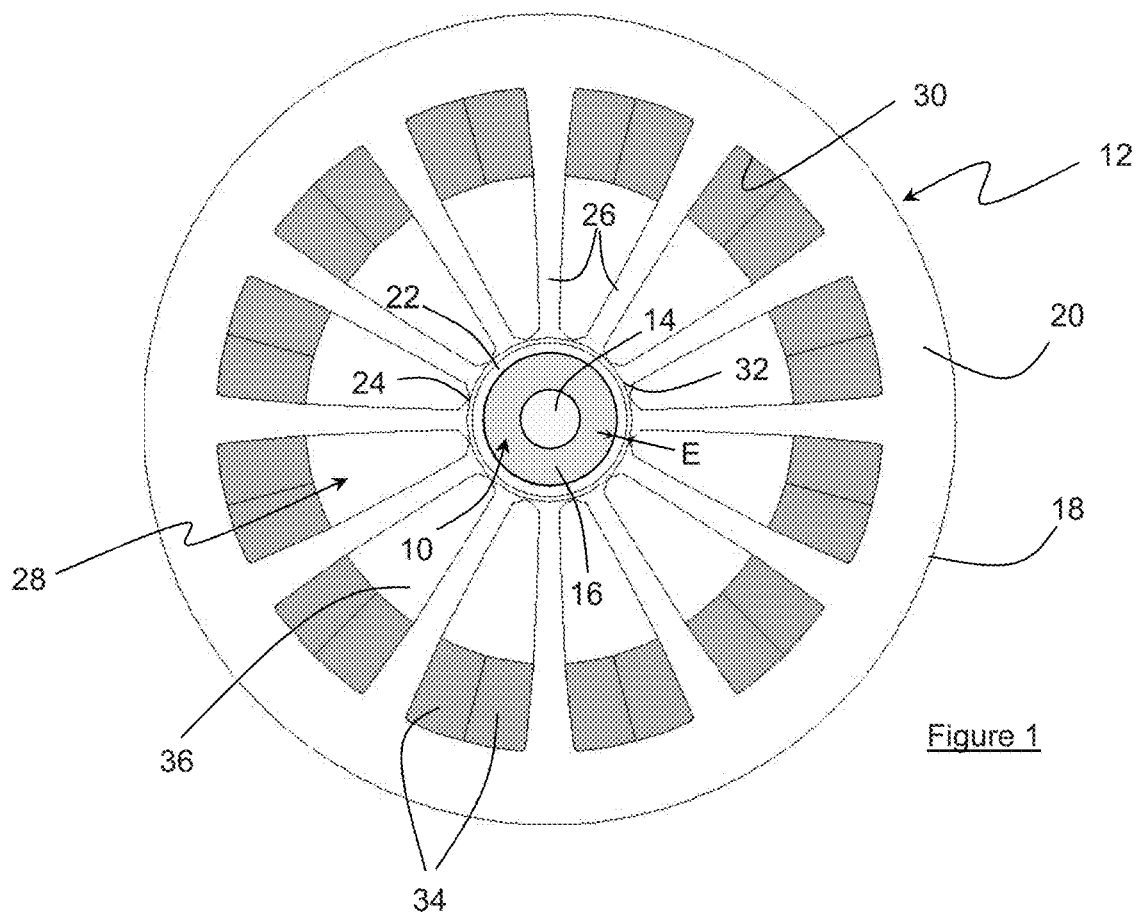
FIG. 1 is a radial sectional view of the electrical machine according to the invention, FIG. 2, which is a view similar to that of FIG. 1, illustrates a sectional view of the path of the magnetic field lines in the rotor and stator, FIGS. 3 and 4 which illustrate various configurations of the stator of the machine of FIG. 1, and FIG. 5 which shows an alternative form of the electrical machine of FIG. 1.

The rotary electrical machine illustrated in FIG. 1, which is in this instance by way of example an electrical motor, comprises a rotor 10 and a stator 12 which, when assembled, are nested one inside the other coaxially, leaving the rotor free to rotate.

This machine, solely by way of example in the remainder of the description, is a synchronous machine with a single pair of poles.

That does not limit the invention from being used in any other electrical machine, such as with a squirrel cage or wound rotor asynchronous machines.

The rotor of the machine according to FIG. 1 comprises, in a way known per se, a shaft 14, which is preferably magnetic, on which is placed a stack of identical planar ferromagnetic laminations which are assembled to one another by any known means to form a rotor body 16.

This rotor contains magnetic-flux generators (not depicted), chiefly permanent magnets of a length substantially equal to the length of the rotor body.

The stator also comprises a stack of identical planar ferromagnetic laminations which are joined together by any known mechanism to form a tubular stator body 18.

This stator body comprises a planar annular external border 20 (or yoke) and a recessed central part 22 delimited by a tubular bearing 24 inside which the rotor is housed.

An air gap E is thus formed between the external periphery of the rotor and the internal periphery of the tubular bearing of the stator.

The yoke of the stator is connected to the tubular bearing by a multitude of evenly circumferentially distributed radial webs 26, which in this instance 12 webs are disposed at 30° apart which between them delimit radial passages 28 of substantially triangular shape with the tip of the triangle directed towards the bearing. These passages extend radially from the lower edge 30 of the annular yoke 20 as far as the external edge 32 of the bearing and are deployed axially all along the stator body 18.

For the sake of simplicity, in the remainder of the description, the webs are referred to as stator teeth.

As illustrated in FIG. 1, the stator comprises magnetic-flux generators. In this instance, the flux generators are armature windings 34, which are preferably sealed against liquids and are housed in the passages 28. More specifically, the windings 34 are located near the radially outer edge 30 of the annular yoke. The passages have two portions with a radially outward portion that houses the armature windings and a radially inward portion in which cooling fluid flows. The radial dimension of the inward portion is greater than the radial outward portion.

Figure 2:
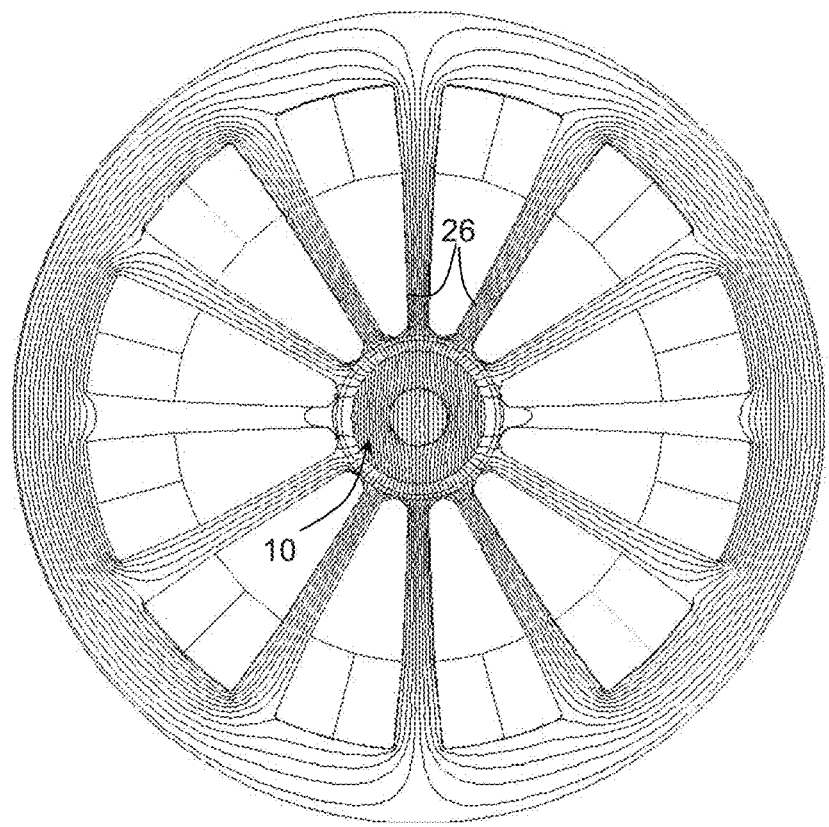

The stator teeth 26, which are very long, thus allow the windings to be spaced away from the bearing. In addition, as better illustrated in FIG. 2, these teeth allow the magnetic flux generated by the windings, which are distant from the rotor, to be guided towards the rotor 10.

In this way, the size of the air gap E is reduced (a few millimeters) making it possible to optimize the efficiency and performance of the machine.

The fluid circulation radial passages 28 include axial galleries 36 located between the windings. The external edge of the bearing 24 and the stator teeth 26 therefore form a stator grating allowing a fluid, such as a gaseous or liquid fluid, to pass through it.

This makes it possible to ensure the integration in a gaseous or fluid stream of the machine and/or the cooling thereof and therefore makes it possible to ensure optimized positioning in a given system constrained by at least one of size and the release of heat.

In addition, the magnetic characteristics of the machine make it possible to limit the quantity of active substance of the electrical machine for a given performance level, notably in comparison to a machine with a large air gap.

Figure 3:
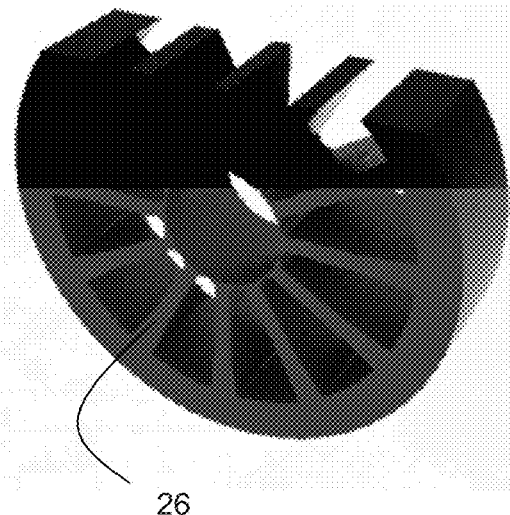

As illustrated in FIG. 3, the teeth 26 that make up the stator grating may have an axial direction substantially parallel to the fluid passage, which is substantially parallel to the longitudinal axis of the stator, to have the least possible influence on the direction of the passage of the fluid.

Also, the axial direction of these teeth may be inclined with respect to the longitudinal axis of the stator.

Figure 4:
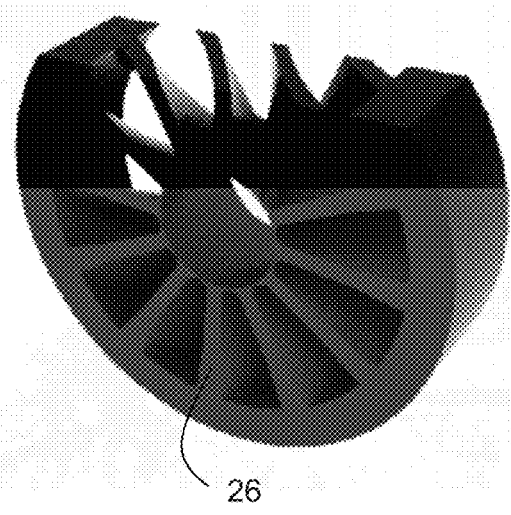

This direction may also be a complex aerodynamic shape, such as a twisted shape as illustrated in FIG. 4, intended to guide; initiate or halt the movement of the fluid.

This twisted shape makes it possible to increase the surface area for contact of the teeth with the cooling fluid.

Moreover, the twisting of the stator teeth may prove beneficial from a magnetic standpoint because it makes it possible to reduce torque ripple according to the angle of inclination.

The teeth may also have an aerodynamic profile to minimize the pressure drop losses associated with the passage of fluid through the grating, such as a cross-sectional shape of a teardrop or an aerofoil.

A surface treatment of the stator renders this machine compatible with the food, petrochemical, building and public works industry and other industries requiring a fluid to be at least one of transported and guided through an electrical machine.

From a machine-cooling standpoint, this type of electrical machine offers a very high surface area for heat exchange with the stator, making it possible to use a cooling system that is simplified in comparison with a conventional electrical machine of similar performance and potentially making it possible to increase current density in the stator as a result of optimized cooling.

It should be noted that this type of electrical machine may notably be integrated fairly simply as a replacement for an existing system.

Figure 5:
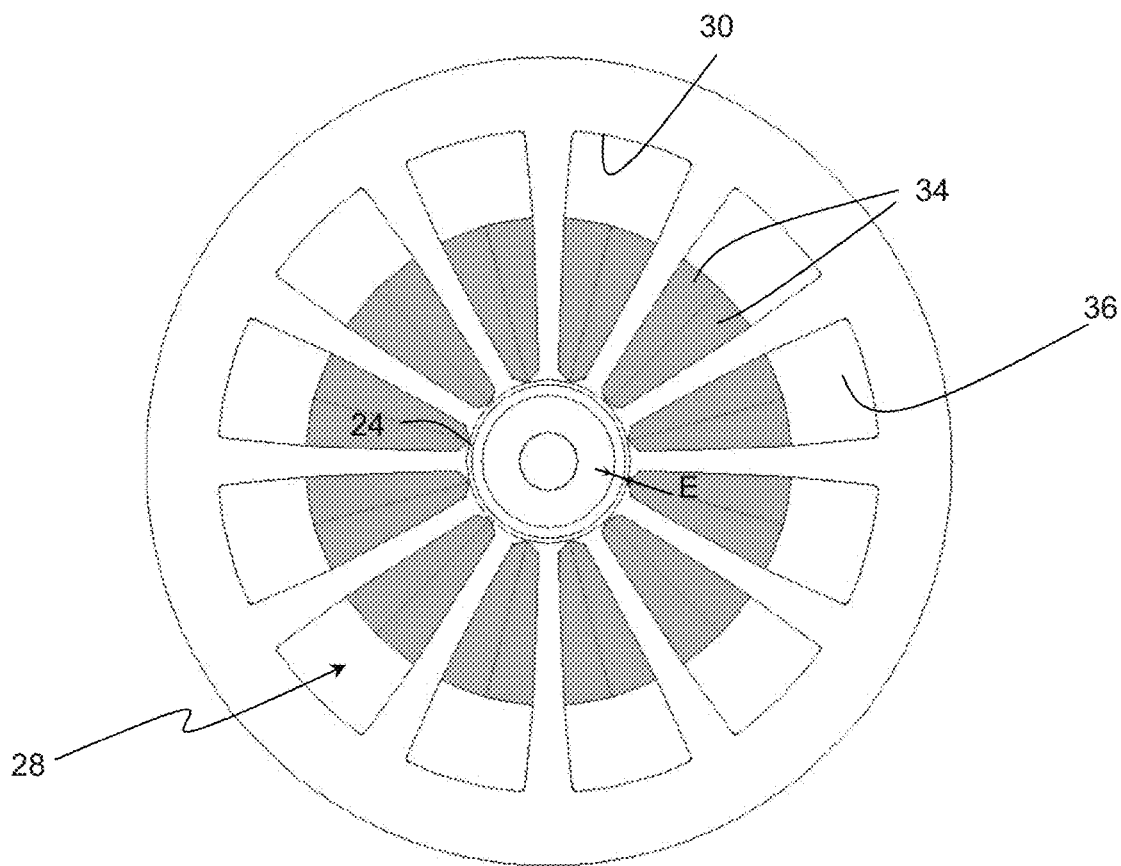

The alternative form in FIG. 5 differs from FIG. 1 in that the windings 34 are placed in the passages 28 near the bearing 24 and therefore as close as possible to the air gap E.

The fluid circulation passages include galleries 36 for the passage of fluid which are situated between the windings and the radially outer edge 30 of the annular yoke 20 of the stator and the webs 26.

The invention claimed is:

1. An electrical machine comprising:
a stator and a rotor;
a stator bearing containing the rotor;
the stator including radial passages which are substantially triangular in shape with a tip of the substantially triangular passages being proximate to and directed towards the stator bearing and the radial passages are located circumferentially in and around the stator;
the stator having an annular planar external border; and
magnetic flux generators housed radially outward from the tips of the substantially triangular in shape radial passages and being adjacent to the annular planar external border, elongated radial webs bounding each radial passage and which conduct magnetic flux from the magnetic flux generators to the stator bearing and the radial passages circulating cooling fluid to cool the magnetic flux generators, each radial passage being divided into a first radial outward portion having a first radial dimension and which houses one of the magnetic flux generators located radially away from the rotor and into a second radial inward portion having a second radial dimension and in which the cooling fluid flows with the second radial inward portion being located between the stator bearing and a radially inward portion of the magnetic flux generator and the second radial dimension being greater than the first radial dimension.

2. The electrical machine according to claim 1 wherein the radial webs extend substantially parallel to a longitudinal axis of the stator.

3. The electrical machine according to claim 2 wherein the radial webs are inclined in an axial direction with respect to the longitudinal axis of the stator.

4. The electrical machine according to claim 3 wherein the cooling fluid is gaseous.

5. The electrical machine according to claim 3 wherein the cooling fluid is liquid.

6. The electrical machine according to claim 2 wherein the radial webs are twisted with respect to the longitudinal axis of the stator.

7. The electrical machine according to claim 6 wherein the cooling fluid is gaseous.

8. The electrical machine according to claim 6 wherein the cooling fluid is liquid.

9. The electrical machine according to claim 2 wherein the cooling fluid is gaseous.

10. The electrical machine according to claim 2 wherein the cooling fluid is liquid.

11. The electrical machine according to claim 1 wherein the radial webs are inclined in an axial direction with respect to a longitudinal axis of the stator.

12. The electrical machine according to claim 11 wherein the cooling fluid is gaseous.

13. The electrical machine according to claim 11 wherein the cooling fluid is liquid.

14. The electrical machine according to claim 1 wherein the radial webs are twisted with respect to a longitudinal axis of the stator.

15. The electrical machine according to claim 14 wherein the cooling fluid is gaseous.

16. The electrical machine according to claim 14 wherein the cooling fluid is liquid.

17. The electrical machine according to claim 1 wherein a longitudinal section of the radial webs has an aerodynamic profile which is wing or is tear shaped.

18. The electrical machine according to claim 17 wherein the cooling fluid is gaseous.

19. The electrical machine according to claim 1 wherein the cooling fluid is gaseous.

20. The electrical machine according to claim 1 wherein the cooling fluid is liquid.

\* \* \* \* \*